United States Patent [19]
Appolonia

[11] Patent Number: 5,522,227
[45] Date of Patent: Jun. 4, 1996

[54] APPARATUS AND METHOD OF FREEZING FOOD

[75] Inventor: John J. Appolonia, Yardley, Pa.

[73] Assignee: The BOC Group, Inc., New Providence, N.J.

[21] Appl. No.: 282,057

[22] Filed: Jul. 28, 1994

Related U.S. Application Data

[63] Continuation of Ser. No. 997,824, Dec. 29, 1992, abandoned.

[51] Int. Cl.⁶ .............................. F25D 13/06; F25D 17/02
[52] U.S. Cl. .................................... 62/63; 62/64; 62/374; 62/375
[58] Field of Search ............................. 62/63, 64, 373, 62/374, 375, 378, 380

[56] References Cited

U.S. PATENT DOCUMENTS

| | | | |
|---|---|---|---|
| 1,880,232 | 10/1932 | Birdseye | 62/375 X |
| 2,057,366 | 10/1936 | Chapman | 62/375 X |
| 2,263,452 | 11/1941 | Birdseye | 62/375 X |
| 2,332,367 | 10/1943 | Birdseye | 62/375 X |
| 3,395,549 | 8/1968 | Grimes | 62/375 X |
| 3,558,105 | 1/1971 | Moritz | 62/374 X |
| 3,605,428 | 9/1971 | Smith et al. | 62/375 X |
| 3,609,987 | 10/1971 | Waldin | 62/375 X |
| 3,696,631 | 10/1972 | Valdes | 62/375 X |
| 3,889,488 | 6/1975 | Maeda et al. | 62/374 X |
| 4,377,937 | 3/1983 | Alquier et al. | 62/374 |
| 4,479,363 | 10/1984 | Gibson et al. | . |
| 4,655,047 | 4/1987 | Temple et al. | 62/64 |
| 4,843,840 | 7/1989 | Gibson | . |
| 4,982,577 | 1/1991 | Milankov et al. | 62/375 X |
| 5,299,426 | 4/1994 | Lermuzeaux | 62/63 |

FOREIGN PATENT DOCUMENTS

| | | |
|---|---|---|
| 1217351 | 2/1987 | Canada . |
| 0372354A2 | 6/1990 | European Pat. Off. . |
| 0505222A1 | 9/1992 | European Pat. Off. . |
| 0519578A1 | 12/1992 | European Pat. Off. . |
| 1603509 | 6/1971 | France ............... 62/64 |
| 2530323 | 1/1984 | France . |

OTHER PUBLICATIONS

Ann Callens, "Cryogeen Invriezen biedt vele voordelen", *Koude Magazine*, No. 4, pp. 12–15, 4 Apr. 1992.

Frigoscandia Food Process Systems "News from Frigoscandia" Spring/Summer 1992.

*Primary Examiner*—Christopher Kilner
*Attorney, Agent, or Firm*—R. Hain Swope; David A. Draegert; Larry R. Cassett

[57] ABSTRACT

Method and apparatus for continuously freezing a food product in which the food product is contacted on a conveyor with a liquid refrigerant under conditions of turbulent flow to thereby freeze at least the outer surface of the food product. The frozen food product and the liquid refrigerant are thereafter separated.

43 Claims, 4 Drawing Sheets

APPARATUS AND METHOD OF FREEZING FOOD

This is a continuation application of Ser. No. 07/997,824 filed Dec. 29, 1992, now abandoned.

TECHNICAL FIELD

The present invention is generally directed to apparatus and methods of freezing food using a liquid refrigerant. The food is contacted with the refrigerant under conditions generating a turbulent flow to provide more efficient freezing and better separation of the individual pieces of food.

BACKGROUND OF THE PRIOR ART

The freezing of food using a liquid refrigerant, such as liquid nitrogen, has been practiced on a commercial scale for several years. A typical commercial freezing process begins by placing the food onto a continuous conveyor. The conveyor travels into a bath of the liquid refrigerant in a manner which immerses the food in the liquid refrigerant. The frozen food is removed from the bath by the conveyor and sent for further freezing, processing and packaging.

Processes by which food is immersed in a relatively fixed bath of liquid refrigerant are disadvantageous because the food product in the form of individual pieces of food tend to be frozen together. This requires a mechanical separation procedure which can damage the food, particularly delicate food products such as shrimp, scallops, clams and the like.

Such processes are also disadvantageous because large loses of the liquid refrigerant result from the passage of the conveyor into and out of the bath. The conveyor is continuously being cooled upon entry into the bath and warmed upon exiting the bath. As a result, large quantities of the liquid refrigerant are consumed in the process adding significantly to the cost of freezing.

Another method of freezing food employs a tunnel freezer. The food product is placed onto a continuous conveyor which enters a thermally insulated box equipped with fans. Liquid refrigerant is injected into the insulated box and vaporizes thereby cooling the interior of the insulated box. The fans within the insulated box circulate the cold vapor and convectively freeze the food.

Tunnel freezers of the type described above are disadvantageous because the convective cooling process is relatively slow. In addition, a relatively large insulated box is needed, increasing the cost of the freezer and occupying valuable processing area.

Tunnel freezers are also disadvantageous because like the immersion freezers described above, if the pieces of food are not separated prior to entering the freezer, they must be mechanically separated after the freezing operation. In addition, wet and delicate food products such as shrimp, scallops, clams and the like tend to stick to the conveyor, requiring mechanical removal thereof. The implementation of mechanical devices to separate pieces of food from each other and/or from the conveyor may cause damage to delicate food products.

More recently, methods of freezing have been disclosed, particularly for freezing liquids such as creams, liquid egg and the like, in which a liquid refrigerant flows through inclined channels provided by a trough.

Peter H. Gibson et al., U.S. Pat. No. 4,479,363 disclose a process for freezing a liquid in which the liquid is passed into or onto a stream of liquified gas along an inclined channel. The stream of liquified refrigerant is characterized by a laminar flow and the patent states that turbulent flow is to be avoided.

Peter H. Gibson, U.S. Pat. No. 4,843,840 discloses a process for freezing liquid food products using a channeled conduit to convey the liquid refrigerant. A smooth, non-turbulent flow of the liquid refrigerant is required to achieve uniformity in and control over both the size of product and the extent to which the food product is cooled.

Despite the benefit achieved by these methods, there is still the need for processes of freezing food which at least substantially reduce the freezing of solid pieces of food together and which freezes the food product in an even more cost efficient manner.

SUMMARY OF THE INVENTION

In accordance with the present invention it has been discovered that a freezer comprising at least one inclined channel formed by a trough is particularly adapted for the freezing of food, especially hard and soft solid food, when a liquid refrigerant is transported along the channel(s) under turbulent flow conditions.

The present invention is generally directed to an apparatus and method for freezing food products in the form of individual pieces of food using a liquid refrigerant in which the food is frozen in a more efficient manner and the individual pieces of food do not stick together as they proceed through the freezing operation. In accordance with the invention, there is provided, in its broadest aspect, a continuous method of freezing food, especially solid pieces of food, comprising supplying the individual pieces of food to a conveyor means, contacting the pieces of food on the conveyor means with a liquid refrigerant under conditions of turbulent flow to thereby freeze at least the outer surface of the food product, and separating the individual frozen pieces of food from the liquid refrigerant.

The apparatus is constructed to insure that the liquid refrigerant contacts the food product under turbulent flow conditions. As used herein the term "turbulent flow" shall mean that the velocity of the flow of liquid refrigerant at a given point varies erratically in magnitude and direction over time. Laminar flow, which is typical of prior art processes, provides a streamline non-erratic flow at a given point over time.

The manner in which the turbulent flow is provided can vary. For example, the conveyor means may be provided with an uneven surface in the direction of the flow path of the liquid refrigerant. This uneven surface may be in the form of spaced apart raised ridges. In addition, or alternatively, the conveyor means may comprise a plurality of individual conveyors arranged in the form of a tier in which the liquid refrigerant falls from the forward end of one conveyor to the rear end of the conveyor next below it. The force under which the liquid refrigerant contacts the rear end of each conveyor being sufficient to generate a turbulent flow through at least a portion of the flow path within the freezer.

Other methods of creating a turbulent flow may be employed in the present invention and include, for example, causing the liquid refrigerant to enter the freezer under turbulent flow or by feeding the food product to the freezer in a manner which creates a turbulent flow in the liquid refrigerant.

Turbulent flow provides several benefits over freezing food products using a stationary bath of liquid refrigerant or using a laminar flow of liquid refrigerant. First, turbulent flow mixes the food product with the liquid refrigerant in a manner which achieves more uniform freezing. Second, turbulent flow at least substantially reduces the incidence of individual pieces of food sticking together. Third, turbulent flow increases the rate of freezing which improves the quality of the food product and reduces the cost of freezing including reducing the size of the freezer.

BRIEF DESCRIPTION OF THE DRAWING

The following drawings are illustrative of embodiments of the invention and are not intended to limit the invention as encompassed by the claims forming part of the application.

DETAILED DESCRIPTION OF THE INVENTION

Figure 1:
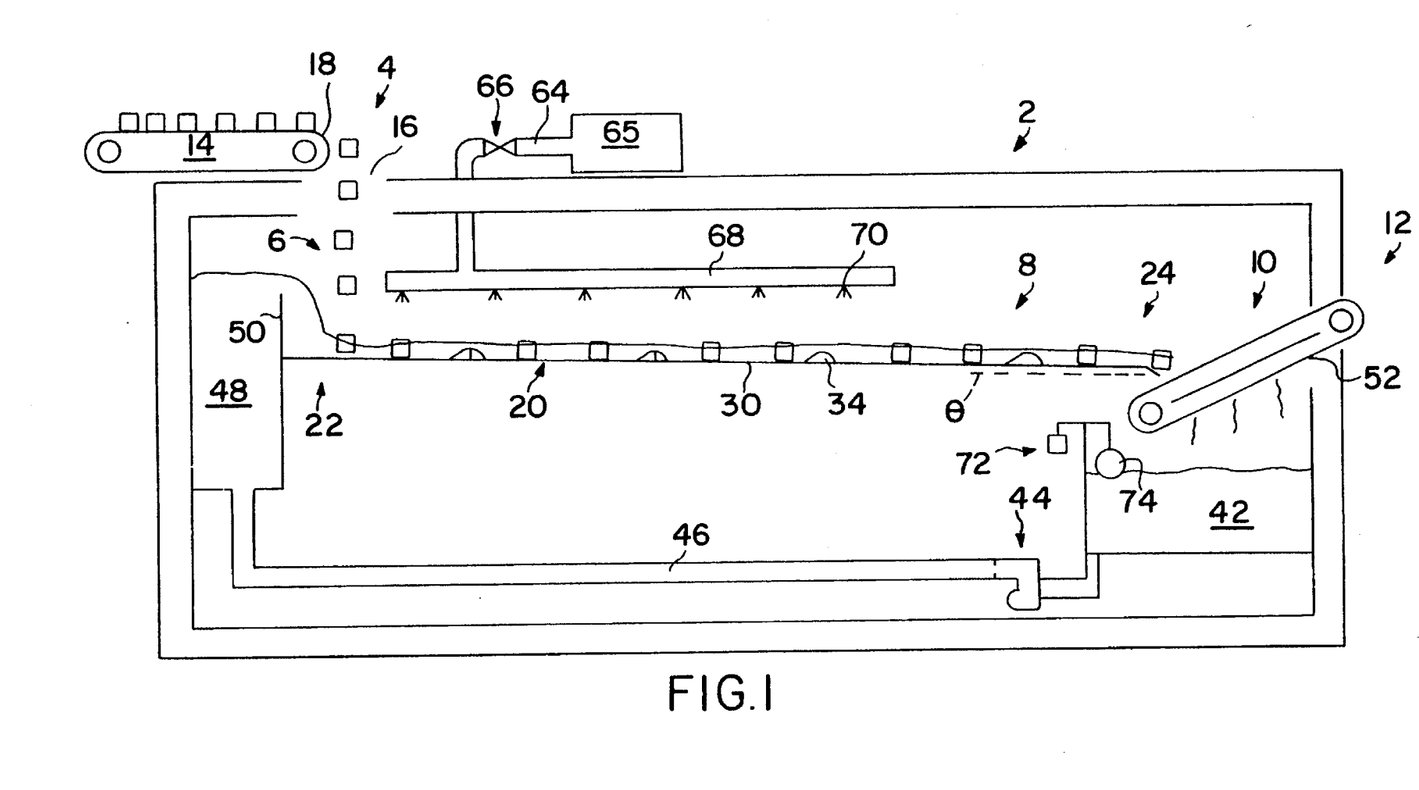
FIG. 1 is a schematic view of one embodiment of the invention employing a single conveyor for freezing individual pieces of food under turbulent flow conditions.

Referring to the drawings and particularly to FIG. 1, there is shown an embodiment of the freezer of the present invention using a single conveyor in the form of a trough having a single channel for contacting the food product in the form of individual pieces of food with the liquid refrigerant. The freezer 2 includes a food entry section 4, a liquid refrigerant entry section 6, a freezing section 8, a separation section 10 where the liquid refrigerant and frozen food are separated and a frozen food exit section 12 where the frozen food is discharged from the freezer 2.

Figure 2A:
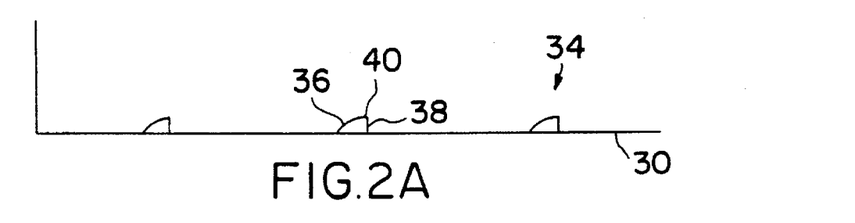
FIG. 2A is a side view of the conveyor shown in FIG. 1 having spaced apart elevated ridges adapted to create a turbulent flow of the liquid refrigerant.
Figure 2B:
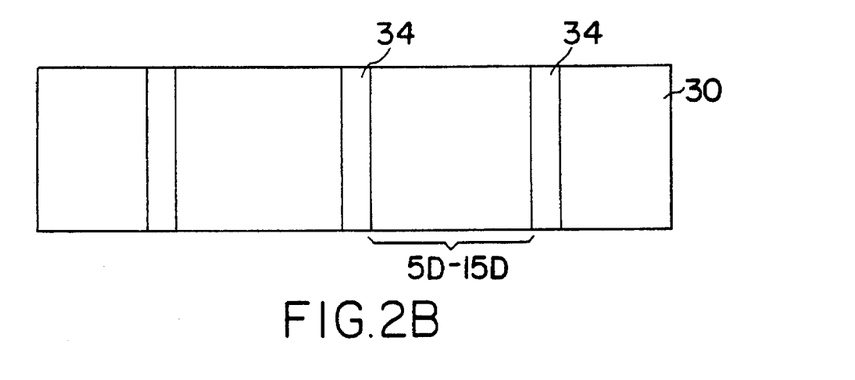
FIG. 2B is a plan view of the conveyor shown in FIG. 1.
Figure 2C:
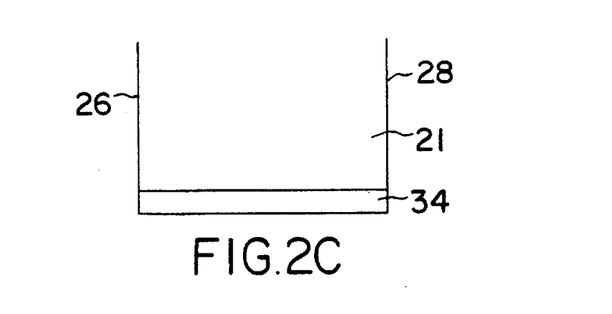
FIG. 2C is a front view of the conveyor shown in FIG. 1.

The food entry section 4 includes a conveyor means which may be, for example, a conveyor belt 14 for transporting individual unfrozen pieces of food from a source (not shown) to an entry port 16 opening into the freezer 2. The pieces of food are transported by the conveyor belt 14 and fall off the end 18 thereof onto a trough 20 having a rear end 22 for receiving the food product and a forward end 24 defining a channel 21 (see FIG. 2C) for transporting the liquid refrigerant and the food product as it undergoes freezing. The distance from the entry port 16 to the trough 20 is preferably sufficient so that the impact of the food product on the liquid refrigerant contained in the trough 20 is sufficient to generate a turbulent flow. Typically, the distance from the entry port 16 to the trough 20 is from about 6 to 24 inches.

The trough is adapted to house a flow of liquid refrigerant and the food product as the food product becomes frozen and to transport the same to the separation section 10.

Primary freezing of the food product, where at least the outer surface of the food is frozen, occurs in the trough 20. Secondary freezing of the interior portions of the food product may occur in the trough 20 or in an additional freezer (not shown) after the food passes out of the exit section 12 of the freezer 2.

The extent to which the individual pieces of food are frozen is dependent on the residence time of the food product in the liquid refrigerant, the depth of the liquid refrigerant and the temperature of the food entering the freezer.

The residence time of the food product within the liquid refrigerant is dependent on the length of the trough and its angle of inclination $\theta$. The longer the trough, the greater the time the food product will be in contact with the liquid refrigerant and, therefore, the greater the extent of freezing. Conversely, as the angle of inclination $\theta$ increases, the time the food product is in contact with the liquid refrigerant decreases resulting in a lesser degree of freezing. The preferred angle of inclination is from about 0.5° to 5.0°.

The depth of the liquid refrigerant is also a factor in the freezing of the food product. The depth of the liquid refrigerant should be sufficient to allow all sides of the food product to be in contact with the liquid refrigerant for a time sufficient to freeze at least the outer surface thereof. It is desirable to maintain the depth of the liquid refrigerant within the range of from 0.5D to 2.0D, preferably 0.5D to 1.5D, where D is the maximum thickness of the food product.

The temperature of the food product entering the freezer 2 is another factor when considering the freezing of a food product in accordance with the present invention. The higher the temperature of the food product entering the freezer 2, the greater the heat which must be removed to freeze at least the outer surface thereof. Accordingly, foods at relatively high temperatures, e.g. at least 50° F., require a greater length of time in contact with the liquid refrigerant than food products entering the freezer at lower temperatures.

By way of example, a food product having a temperature of 30° to 50° F. and a maximum thickness of from about 0.25 to 0.75 inch (e.g. diced chicken) can be frozen, in accordance with the present invention, in a trough having a length of from about 5 to 15 feet, an angle of inclination of about 0.5° to 5°, and a depth of liquid refrigerant of from about 0.125 to 1.5 inches.

In accordance with the present invention, the flow of liquid refrigerant within the trough 20 is turbulent which improves the efficiency of cooling and keeps the individual pieces of food separated. Turbulent flow may be obtained by providing the base 30 of the trough 20 with an uneven surface. In this regard, the base 30 may be provided with a plurality of spaced apart ridges 34 extending between the opposed walls 26, 28 and transverse the flow path of the liquid refrigerant. One such design which accomplishes this purpose is shown by reference to FIGS. 2A–2C where the ridges 34 are comprised of a front side 36 facing the flow of liquid refrigerant and a rear side 38. The front side 36 is angled with respect to the base 30 and rises to an apex 40 while the rear side 38 is substantially perpendicular to the base 30. The flow of the liquid refrigerant over the ridge creates turbulence when the liquid refrigerant hits the base 30 after dropping from the apex 40. Other means of modifying the flow path along the base 30 to create turbulent flow would be obvious to one of ordinary skill in the art.

The ridges 34 are spaced apart to generate the turbulent flow of the liquid refrigerant. It is preferred that the distance between the ridges 34 be in the range of from about 5.0D to 15.0D, where D is the maximum thickness of the food product as shown best in FIG. 2B.

Figure 2D:
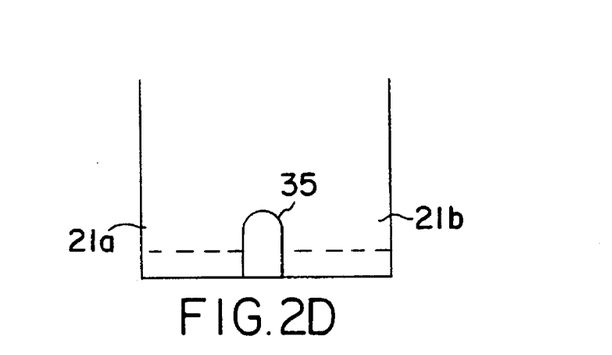
FIG. 2D is a front view of a conveyor having multiple channels.

In another embodiment of the invention, as shown in FIG. 2D, multiple channels 21a and 21b are provided which are separated by a divider 35. Multiple channels 21a and 21b are desirable when different types of products or different sizes of the same food product are to be frozen and must remain separated at least through the freezing process. For example, multiple channels may be employed when freezing different sized shrimp. It is understood that the separation of the shrimp into different sizes may occur prior to their transportation to the freezer of the present invention.

Liquid refrigerant is supplied to the trough 20 at its rear end 22 from a sump 42 located beneath the separation section 10 which is used to capture reclaimed liquid refrigerant as explained hereinafter. A pump 44 transfers liquid refrigerant from the sump 42 through a conduit 46 into a reservoir 48 which is located proximate to the rear end 22 of the trough 20.

The reservoir 48 is separated from the rear end 22 of the trough 20 by a wall 50. As the liquid refrigerant is delivered to the reservoir 48, it overflows the wall 50 and falls into the trough 20. The height of the wall 50 can be set to provide for a sufficient drop of the liquid refrigerant to create a turbulent flow in the trough 20. The height of the front wall 50 for creating a turbulent flow is typically within the range of from about 3 to 12 inches.

The separation section 10 is adapted to separate the liquid refrigerant and the frozen food obtained from the forward end 24 of the trough 20. As shown best in FIGS. 3 and 4, the separation section 10 includes a conveyor belt 52 having a base 54 with perforations 56 therein (shown best in FIG. 4) extending from a rear end 58 to a forward end 60.

Figure 3:
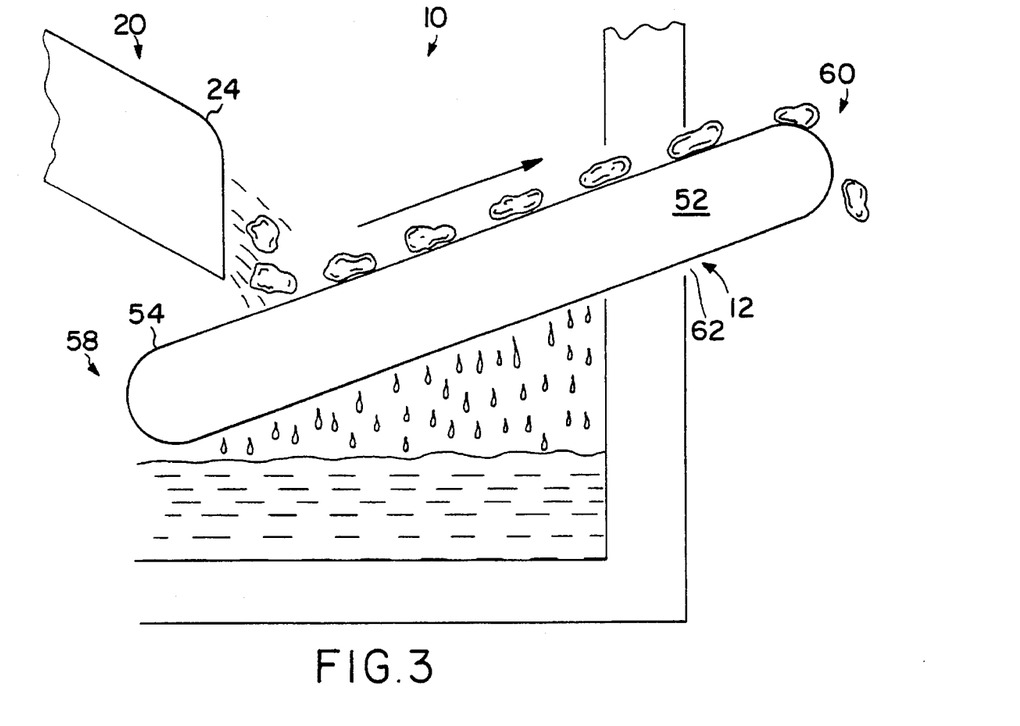
FIG. 3 is a partial schematic view of the separation section of the embodiment shown in FIG. 1.
Figure 4:
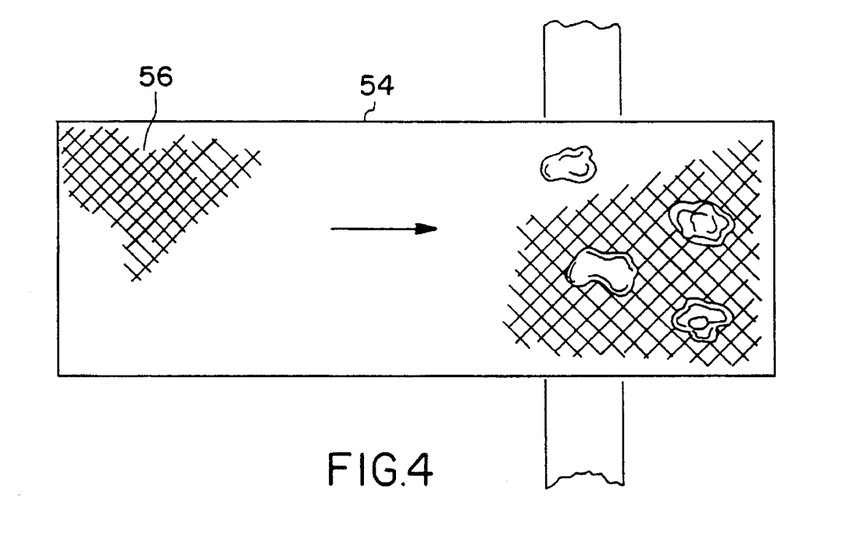
FIG. 4 is a top view of the conveyor used in the separation section shown in FIG. 3.

The rear end 58 lies below the forward end 24 of the trough 20 and therefore is adapted to receive the liquid refrigerant and frozen pieces of food from the trough 20. The perforations 56 in the base 54 are sufficiently large to enable the liquid refrigerant to pass therethrough, yet small enough so that the individual pieces of food remain on the base 54. The liquid refrigerant, therefore, passes through the conveyor belt 52 into the sump 42 for recirculation.

The frozen pieces of food remaining on the conveyor belt 52 are transferred to the frozen food exit section 12 comprised of an opening 62 within the freezer 2 remote from the entry port 16. The frozen food is conveyed through the opening 62 for further processing, freezing, and/or packaging (not shown).

During the freezing process, some of the liquid refrigerant contained within the trough 20 will boil off which may require replacement of the liquid refrigerant during its travel from the rear end 22 to the forward end 24 of the trough 20. Referring to FIG. 1, the replacement liquid refrigerant may be supplied from a liquid refrigerant tank 65 via a conduit 64 through a flow control valve 66. The liquid refrigerant is distributed along at least a portion of the length of the trough 20 by a header 68 comprising a plurality of spaced apart outlets 70 through which the liquid refrigerant passes into the trough 20.

The header 68 is preferably spaced apart from the base 30 of the trough 20 by a distance such that entry of the replacement liquid refrigerant into the trough 20 will create a turbulent flow therein. The distance between the header 68 and the base 30 to create turbulent flow of the liquid refrigerant is typically about 2 to 6 inches.

The opening and closing of the flow control valve 66 is controlled by a sensor 72 which detects the level of the liquid refrigerant in the sump 42 such as through the use of a float 74. When the level in the sump 42 decreases, the sensor 72 detects the downward movement of the float 74 and transmits an electrical signal through an electrical connection (not shown) to the valve 66 which moves to the open position. This allows supplemental liquid refrigerant to be supplied to the trough 20 from the tank 65 until the sensor 72 detects a termination in the decrease of the level of liquid refrigerant in the sump 42.

There will be some loss of liquid refrigerant due to boil off caused by the freezing of the food product at various sections of the freezer. The losses of liquid refrigerant during the freezing process can be made up by adding liquid refrigerant to the sump 42 and/or the header 68 from the tank 65 or other source of liquid refrigerant.

The type of food which may be frozen in accordance with the present invention is generally unlimited and includes both solid and liquid foods including chicken parts, diced chicken meat, fruits, vegetables, diced clams, shrimp, scallops and oysters and the like.

The type of liquid refrigerant which may be used must meet safety requirements for processing of food. Liquid nitrogen is the preferred liquid refrigerant because of its relatively low cost.

Figure 5:
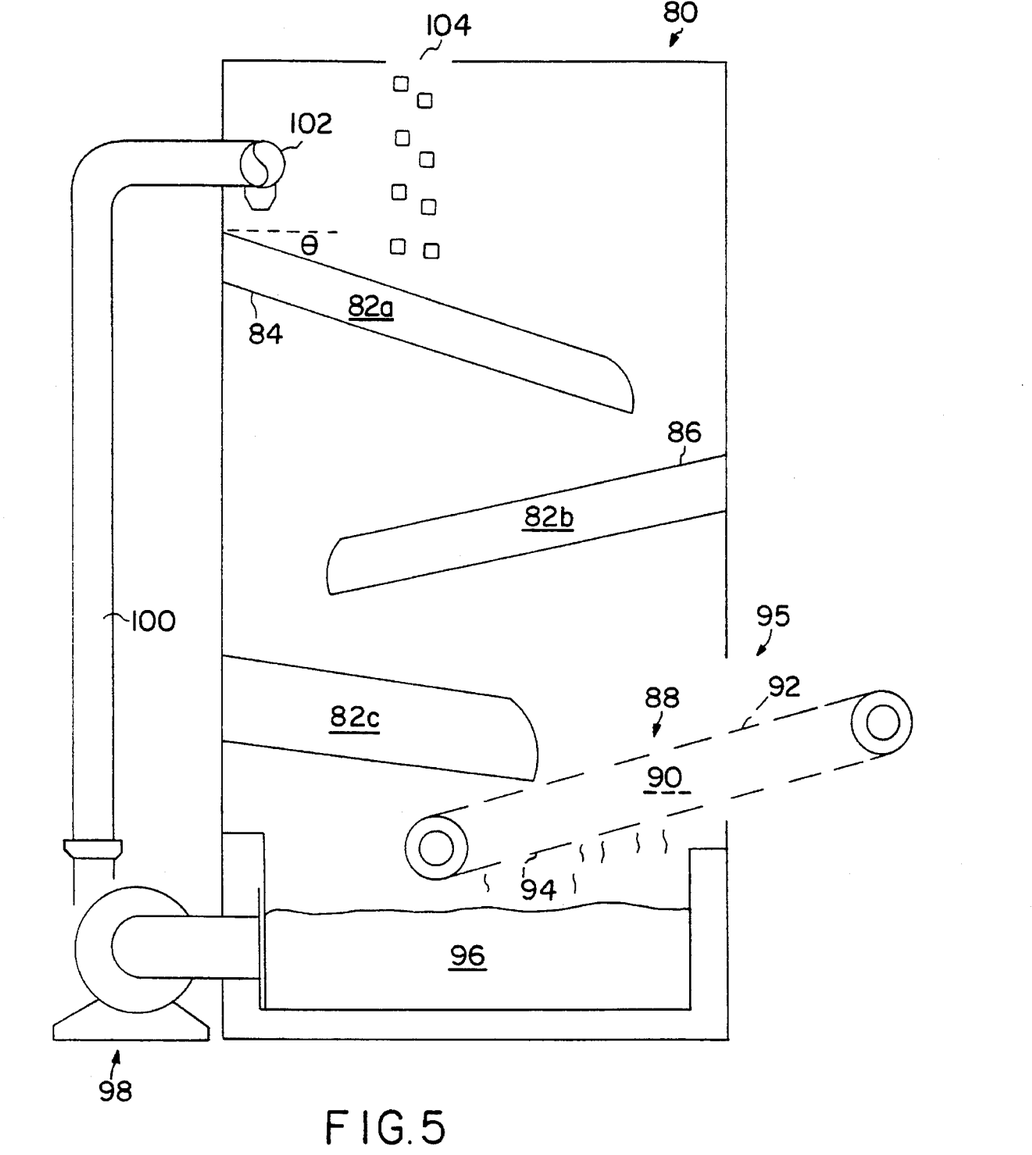
FIG. 5 is a schematic view of another embodiment of the invention employing multiple conveyors arranged in a tier for freezing individual pieces of food under turbulent flow conditions.

In another embodiment of the invention, turbulent flow is provided by employing multiple conveyors within the freezer section such that the liquid refrigerant and processed food "drop" from one conveyor to another.

Referring to FIG. 5, there is shown a freezer 80 having a series of three troughs 82a–82c each angled downwardly by an angle θ of about 0.5° to 5° to create a flow of both liquid refrigerant and food product from the rear end 84 of an upper trough (i.e. trough 82a) to the rear end 86 of the next trough (i.e. 82b) in sequence until the liquid refrigerant and the frozen food product are passed into a separation section 88. As described in connection with FIG. 1, the separation section 88 includes a conveyor belt 90 having a base 92 with perforations 94 therein (see FIG. 4) allowing the liquid refrigerant to pass into a sump 96 and the frozen food to proceed out of the freezer through the exit 95.

The liquid refrigerant is supplied from the sump 96 to the rear end 84 of the topmost trough 82a via a pump 98, through a conduit 100 and through a spray header 102. the latter device creates a spray of the liquid refrigerant of sufficient force to create a turbulent flow in the trough 82.

The pieces of food to be frozen enter the freezer 80 through an opening 104 from a conveyor (not shown) as previously described in connection with FIG. 1. The distance the pieces of food fall through the opening 104 and into the trough 82 may create a turbulent flow where the pieces of food contact the liquid refrigerant. The distance from the opening 104 to the trough 82a is typically from about 6 to 24 inches.

One or more of the troughs 82a–82c may be provided with spaced apart ridges, as shown and described in connection with FIGS. 1 and 2A–2D, to generate a turbulent flow or to maintain the turbulent flow generated by the multiple troughs 82a–82C.

EXAMPLE 1

Diced chicken measuring approximately one-half inch on all sides is fed to a freezer of the type shown in FIG. 1. The freezer has the capacity to freeze 1,000 pounds of diced chicken per hour. The pump 44 connected to the sump 42 must deliver a flow rate of liquid refrigerant (e.g. liquid nitrogen) of approximately 40 gallons per minute.

The trough 20 measures 10 feet in length from the rear end 22 to the forward end 24. The trough 20 is provided with ridges 34 at 5 inch intervals. The ridges measure 0.5 inch in height (see FIG. 2C).

The heat removed from the chicken is approximately 25 BTUs per pound and the flow rate of make up liquid nitrogen is approximately 333 pounds per hour which is supplied to the sump 42 from a source of liquid nitrogen.

EXAMPLE 2

The same chicken product used in Example 1 is sent to a freezer of the type shown in FIG. 5. The chicken product was fed to the freezer at the rate of 1,000 pounds per hour requiring a flow rate of liquid nitrogen of approximately 40 gallons per minute.

Each of the troughs 82a–82c are 10 feet long and the passage of the chicken along the three troughs results in a heat loss from the chicken of 50 BTUs per pound. The flow rate of liquid nitrogen to make up lost refrigerant is approximately 666 pounds per hour.

What is claimed is:

1. A continuous method of freezing a food product comprising:
    (a) supplying said food product having an outer surface to a conveyor means;
    (b) contacting the food product on the conveyor means with a liquid refrigerant under conditions of turbulent flow for at least a portion of a time the food product is in contact with the liquid refrigerant to thereby freeze at least the outer surface of the food product; and
    (c) separating the frozen food product from the liquid refrigerant, wherein the conveyor means comprises at least one trough having a pair of closed walls and a base defining at least one channel for housing the food product during contact with the liquid refrigerant, said base having at least two spaced apart raised ridges transversing the base and extending between the opposed walls, said process comprising directing the liquid refrigerant over the raised ridges to thereby create said turbulent flow.

2. The method of claim 1 comprising transporting the liquid refrigerant from a source to the conveyor means in a manner which generates said turbulent flow of liquid refrigerant.

3. The method of claim 2 comprising transporting the liquid refrigerant from the source to a first position above the conveyor means, and directing the liquid refrigerant downwardly onto said conveyor means.

4. The method of claim 2 further comprising transporting the liquid refrigerant from the source to a second position above the conveyor means, and spraying the liquid refrigerant onto the conveyor means.

5. The process of claim 1 wherein a depth of the liquid refrigerant is in a range of from about 0.5D to 2.0D, where D is a maximum thickness of the food product.

6. The process of claim 1 wherein a depth of the liquid refrigerant is in a range of from about 0.5 to 1.5D, where D is a maximum thickness of the food product.

7. The method of claim 1 wherein at least one trough is inclined at an angle of from about 0.5° to 5.0°.

8. The method of claim 1 wherein the raised ridges are spaced apart by a distance of from about 5D to 15D, where D is a maximum thickness of the food product.

9. The method of claim 1 wherein the conveyor means comprises a plurality of troughs arranged in tiers from an uppermost trough to a lowermost trough, each trough having a rear end and a forward end, the forward end of an upper trough being above the rear end of a next trough, said process comprising directing the liquid refrigerant along the uppermost trough toward and out the forward end onto the rear end of the next trough and continuing the flow of the liquid refrigerant to the lowermost trough.

10. The method of claim 9 wherein the troughs are inclined at an angle of from about 0.5° to 5.0°.

11. The method of claim 9 wherein the raised ridges are spaced apart by a distance of from about 5D to 15D, where D is a maximum thickness of the food product.

12. The method of claim 9 wherein a depth of the liquid refrigerant in at least one trough is in a range of from about 0.5D to 2.0D, where D is a maximum thickness of the food product.

13. Apparatus for freezing a continuous supply of a food product comprising:
    (a) food supply means for delivering said food product having an outer surface to a conveyor means;
    (b) liquid refrigerant supply means for delivering liquid refrigerant to the conveyor means;
    (c) conveyor means for transporting the food product and liquid refrigerant under conditions of turbulent flow to thereby freeze at least the outer surface of the food product; and
    (d) means for separating the frozen food product from the liquid refrigerant, wherein the conveyor means comprises at least one trough having a pair of opposed walls and a base defining at least one channel for housing the food product during contact with the liquid refrigerant, said base having at least two spaced apart ridges transversing the base and extending between the opposed walls.

14. The apparatus of claim 13 further comprising means for transporting the liquid refrigerant from a source to a position above the conveyor means and for directing the liquid refrigerant downwardly onto said conveyor means.

15. The apparatus of claim 13 further comprising means for transporting the liquid refrigerant from a source to a position above the conveyor means and means for spraying the liquid refrigerant onto said conveyor means.

16. The apparatus of claim 13 wherein the ridges are separated by a distance of from about 5D to 15D, where D is a maximum thickness of the food product.

17. The apparatus of claim 13 wherein the at least one trough is inclined at an angle of from 0.5° to 5°.

18. The apparatus of claim 13 comprising a plurality of inclined troughs arranged in tiers from an uppermost trough to a lowermost trough, each trough having a rear end and a forward end, the forward end of an upper trough lying above the rear end of a next trough, wherein the liquid refrigerant travels along the uppermost trough toward and out the forward end onto the rear end of the next trough until the flow of liquid refrigerant reaches the lowermost trough.

19. A continuous method of freezing a food product comprising:
    (a) supplying said food product having an outer surface to a conveyor means;
    (b) contacting the food product on the conveyor means with a liquid refrigerant having a substantially uniform depth in a range of from about 0.5 to 2.0D, where D is a maximum thickness of the food product under conditions of turbulent flow for at least a portion of the time the food product is in contact with the liquid refrigerant to thereby freeze at least the outer surface of the food product; and (c) separating the frozen food product from the liquid refrigerant.

20. The method of claim 19 comprising transporting the liquid refrigerant from a source to the conveyor means in a manner which generates said turbulent flow of liquid refrigerant.

21. The method of claim 20 comprising transporting the liquid refrigerant from the source to a first position above the conveyor means, and directing the liquid refrigerant downwardly onto said conveyor means.

22. The method of claim 20 further comprising transporting the liquid refrigerant from the source to a second position above the conveyor means, and spraying the liquid refrigerant onto the conveyor means.

23. The process of claim 19 wherein the depth of the liquid refrigerant is in the range of from about 0.5 to 1.5D.

24. The method of claim 19 wherein the conveyor means is inclined at an angle of from about 0.5° to 5.0°.

25. The method of claim 19 wherein the conveyor means comprises a plurality of troughs arranged in tiers from an uppermost trough to a lowermost trough, each trough having a rear end and a forward end, the forward end of an upper trough being above the rear end of a next trough, said process comprising directing the liquid refrigerant along the upper trough toward and out the forward end onto the rear end of the next trough and continuing the flow of the liquid refrigerant to the lowermost trough.

26. The method of claim 25 wherein the troughs are inclined at an angle of from about 0.5° to 5.0°.

27. A continuous method of freezing a food product comprising:

(a) supplying said food product having an outer surface to a conveyor means;

(b) contacting the food product on the conveyor means with a liquid refrigerant under conditions of turbulent flow for at least a portion of the time the food product is in contact with the liquid refrigerant to thereby freeze at least the outer surface of the food product; and (c) separating the frozen food product from the liquid refrigerant, wherein the conveyor means comprises a plurality of troughs arranged in tiers and alternating in direction from an uppermost trough to a lowermost trough, each trough having a rear end and forward end, the forward end of an upper trough being above the rear end of a next trough, said process comprising directing the liquid refrigerant along the uppermost trough toward and out the forward end in a first direction onto the rear end of the next trough so that the liquid refrigerant flows in a second different direction and continuing the flow of the liquid refrigerant in said alternating directions to the lowermost trough.

28. The method of claim 27 comprising transporting the liquid refrigerant from a source to the conveyor means in a manner which generates said turbulent flow of liquid refrigerant.

29. The method of claim 28 comprising transporting the liquid refrigerant from the source to a first position above the conveyor means, and directing the liquid refrigerant downwardly onto said conveyor means.

30. The method of claim 28 further comprising transporting the liquid refrigerant from the source to a second position above the conveyor means, and spraying the liquid refrigerant onto the conveyor means.

31. The process of claim 30 wherein a depth of the liquid refrigerant is in a range of from about 0.5D to 2.0D, where D is a maximum thickness of the food product.

32. The method of claim 27 wherein the troughs are inclined at an angle of from about 0.5° to 5.0°.

33. Apparatus for freezing a continuous supply of a food product comprising:

(a) food supply means for delivering said food product having an outer surface to a conveyor means;

(b) liquid refrigerant supply means for delivering liquid refrigerant to the conveyor means;

(c) conveyor means for transporting the food product and liquid refrigerant under conditions of turbulent flow to thereby freeze at least the outer surface of the food product; and (d) means for separating the frozen food product from the liquid refrigerant, said conveyor means comprising a plurality of inclined troughs arranged in tiers in alternating directions from an uppermost trough to a lowermost trough, each trough having the rear end and a forward end, the forward end of an upper trough lying above the rear end of a next trough, wherein the liquid refrigerant travels along the uppermost trough toward and out the forward end in a first direction onto the rear end of the next trough so that the liquid refrigerant flows in a second different direction until the flow of liquid refrigerant reaches the lowermost trough.

34. The apparatus of claim 33 further comprising means for transporting the liquid refrigerant from a source to a position above the conveyor means and for directing the liquid refrigerant downwardly onto said conveyor means.

35. The apparatus of claim 33 further comprising means for transporting the liquid refrigerant from a source to a position above the conveyor means and means for spraying the liquid refrigerant onto said conveyor means.

36. The apparatus of claim 33 wherein the conveyor means comprises at least one trough having a pair of opposed walls and a base defining at least one channel for housing the food product during contact with the liquid refrigerant, said base having at least two spaced apart ridges transversing the base and extending between the opposed walls.

37. The apparatus of claim 36 wherein the ridges are separated by a distance of from about 5D to 15D, where D is a maximum thickness of the food product.

38. The apparatus of claim 36 wherein the at least one trough is inclined at an angle of from 0.5° to 5°.

39. A continuous method of freezing a food product comprising:

(a) supplying said food product having an outer surface to a conveyor means;

(b) contacting the food product on the conveyor means with a liquid refrigerant from a source to a position above the conveyor means, spraying the liquid refrigerant onto the conveyor means under conditions of turbulent flow for at least a portion of the time the food product is in contact with the liquid refrigerant to thereby freeze at least the outer surface of the food product; and (c) separating the frozen food product from the liquid refrigerant, wherein the conveyor means comprises a plurality of troughs arranged in tiers from an uppermost trough to a lowermost trough, each trough having a rear end and a forward end, the forward end of an upper trough being above the rear end of a next trough, said process comprising directing the liquid refrigerant along the uppermost trough toward and out the forward end onto the rear end of the next trough and continuing the flow of the liquid refrigerant to the lowermost trough.

40. The method of claim 39 wherein a depth of the liquid refrigerant is in a range of from about 0.5D to 2.0D, where D is a maximum thickness of the food product.

41. Apparatus for freezing a continuous supply of a food product comprising:
   (a) food suply means for delivering said food product having an outer surface to a conveyor means;
   (b) liquid refrigerant supply means for delivering liquid refrigerant to the conveyor means; and
   (c) conveyor means for transporting the food product and liquid refrigerant under conditions of turbulent flow to thereby freeze at least the outer surface of the food product, said conveyor means comprising at least one trough having the pair of opposed walls and a base defining at least one channel for housing the food product during contact with the liquid refrigerant, said base having at least two space-apart ridges transversing the base and extending between the opposed walls.

42. The apparatus of claim 41 wherein the ridges are separated by a distance of from about 5D to 15D, where D is a maximum thickness of the food product.

43. The apparatus of claim 41 wherein at least one trough is inclined at an angle of from 0.5° to 5°.

* * * * *